United States Patent [19]

Schönfeld et al.

[11] Patent Number: 5,721,282
[45] Date of Patent: Feb. 24, 1998

[54] MOLDING COMPOSITION BASED ON FLUOROPOLYMERS AND PROCESS FOR PRODUCING FOAM MATERIAL THEREFROM

[75] Inventors: Axel Schönfeld, Wiesbaden; Andreas Schleicher, Beselich; Georg Frank, Tübingen; Helmut Scheckenbach, Langen, all of Germany

[73] Assignee: Hoechst Aktiengesellschaft, Germany

[21] Appl. No.: 556,795

[22] Filed: Nov. 2, 1995

[30] Foreign Application Priority Data

Nov. 7, 1994 [DE] Germany .................. 44 39 767.4

[51] Int. Cl.$^6$ .................. C08J 9/06; C08L 27/12; C08L 81/16
[52] U.S. Cl. .................. 521/51; 521/77; 521/89; 521/134; 521/145; 525/189
[58] Field of Search .................. 525/189; 521/51, 521/77, 89, 134, 145

[56] References Cited

U.S. PATENT DOCUMENTS

| | | | |
|---|---|---|---|
| 5,340,843 | 8/1994 | Tsuruta | 521/145 |
| 5,389,725 | 2/1995 | Bando | 525/189 |
| 5,397,831 | 3/1995 | Saito | 524/502 |
| 5,496,917 | 3/1996 | Fleischer | 528/373 |

FOREIGN PATENT DOCUMENTS

| | | |
|---|---|---|
| 0356948 | 3/1990 | European Pat. Off. . |
| 633290 | 1/1995 | European Pat. Off. . |
| 633291 | 1/1995 | European Pat. Off. . |
| 4314737 | 11/1994 | Germany . |

*Primary Examiner*—David Buttner
*Attorney, Agent, or Firm*—Connolly and Hutz

[57] ABSTRACT

Molding composition based on fluoropolymers and process for producing foam material therefrom The invention relates to a molding composition based on fluoropolymers which additionally contain from 1 to 50% by weight of at least one polymer containing sulfoxide groups. The polymer containing sulfoxide groups comprises, in particular, polyarylene sulfoxide units of the formula:

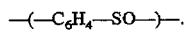

10 Claims, No Drawings

MOLDING COMPOSITION BASED ON FLUOROPOLYMERS AND PROCESS FOR PRODUCING FOAM MATERIAL THEREFROM

DESCRIPTION

Molding composition based on fluoropolymers and process for producing foam material therefrom.

The invention relates to a molding composition based on fluoropolymers and a process for producing foam material by thermal treatment of the molding composition.

Foamed polymer compositions are well known. They are used, in particular, where low weight or a high strength/weight ratio is required. Foamed fluoropolymers can be used as chemical- or heat-resistant insulation material, e.g. in the construction of chemical apparatus.

Foam material is customarily produced from polymer compositions by adding to the polymer composition a blowing agent which liberates gaseous dissociation products on heating. However, the residual products of these blowing agents can sometimes restrict and thus impair the later possible uses of the foam material.

It is an object of the present invention to develop a molding composition based on fluoropolymers and a foam material produced therefrom which does not require the addition of customary blowing agents to the polymer to be foamed, and also a process for producing such a foam material which makes possible strong foaming without addition of blowing agents.

It has surprisingly been found that a mixture of fluoropolymers with polymers containing sulfoxide groups in the polymer chain easily forms a foam material. The thermally unstable sulfoxide decomposes under the action of heat, with the sulfoxide groups being reduced to the sulfide. At the same time, oxygen or $CO_2$ and $H_2O$ are liberated, these acting as blowing agents.

For the purposes of the present invention, polymers containing sulfoxide groups are polymers which contain at least one arylene sulfoxide unit (—Ar—SO—; Ar=arylene). Arylenes are, for example, phenylene, biphenylene (—$C_6H_4$—$C_6H_4$—), naphthalene, anthracene or phenanthrene, which can in each case be monosubstituted or polysubstituted. Substituents are, for example, straight-chain, cyclic or branched $C_1$–$C_{20}$ hydrocarbon radicals such as $C_1$–$C_{10}$-alkyl radicals, e.g. methyl, ethyl, n-propyl, isopropyl, n-butyl, t-butyl, n-hexyl, or $C_6$–$C_{14}$-aryl radicals, e.g. phenyl or naphthyl, halogens, sulfonic acid groups, amino groups, nitro groups, cyano groups, hydroxy groups, alkyloxy groups or carboxyl groups.

A preferred polymer containing sulfoxide groups is polyphenylene sulfoxide which can, for example, easily be prepared by oxidation of polyphenylene sulfide with ozone or nitric acid.

The fluoropolymers used can be the following fluorothermoplastics comprising recurring units of the formulae (I) and (II):

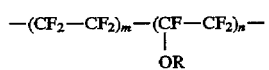

OR

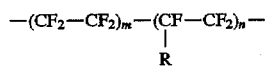

where R in (I) and (II) is a perfluorinated alkyl radical having from 1 to 8 carbon atoms, or a plurality of different radicals of this type; m and n are each numbers from 0.01 to 1 and the sum of n and m is always 1.

Further fluoropolymers which can be used are polymers comprising recurring units of the formulae (III)–(VII):

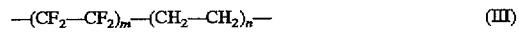  (III)

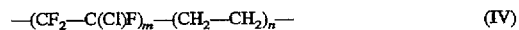  (IV)

  (V)

  (VI)

  (VII)

where n and m are as defined above.

Furthermore, the fluoropolymers used can be substances of the formula (I) or (II) in which fluorine is partially replaced by chlorine. The fluorothermoplastics of the formulae (I)–(VII) can be used individually or in mixtures with fluoropolymers.

The foaming effect achievable according to the invention depends on the type of polymer containing sulfoxide groups, in particular on the number of sulfoxide groups and on the proportion of the polymer containing sulfoxide groups in the fluoropolymer. In addition, the foaming effect depends on the melt viscosity of the fluoropolymer to be foamed.

According to the invention, the proportion of polymers containing sulfoxide groups in the total mixture is in the range from 1 to 50% by weight, preferably from 3 to 30% by weight, particularly 5 to 15% by weight, based on the total weight of the mixture.

The heating of the starting polymers can, according to the invention, be carried out in a temperature range from 240° C. to 360° C. The exact preferred temperature depends on the structure of the polymer containing sulfoxide groups which is used. Depending on the electronic structure on the sulfoxide (electron-withdrawing or electron-donating substituents), the sulfoxide group has a slightly different thermal stability. When using polyphenylene sulfoxide, the temperature is, for example, preferably in the range from 300° C. to 320° C. A polyphenylene sulfoxide brominated on the phenyl group is preferably found in the range from 260° C. to 300° C.

According to the invention, the fluoropolymers used can also be mixtures of various fluoropolymers and the polymers containing sulfoxide groups which are used can also be mixtures of various polymers containing sulfoxide groups. The addition of further polymers such as, for example, polyphenylene sulfide to the mixture to be foamed is also possible.

The molding composition comprising the fluoropolymer and the polymer containing sulfoxide groups can generally be used as unblended material. However, it is also possible to add further fillers such as chalk, talc, clay, mica and/or fibrous reinforcements such as glass and carbon fibers, whiskers, and also further additives and processing aids, e.g. lubricants, mold release agents, antioxidants, UV stabilizers, so that commercial, filled fluoropolymers can be used for foam production.

The fluoropolymers can be used, for example, as powder, compacts or films. The powders here possess commercial particle sizes, with granulated materials also being able to be used. It is also possible to use films or film scraps in a suitable form.

The polymers containing sulfoxide groups should be used in powder form to achieve a uniform foam. The mean particle size ($D_{50}$) is in the range from $0.3 \times 10^{-6}$ to $500 \times$ $10^{-6}$ m, preferably from $0.5 \times 10^{-6}$ to $300 \times 10^{-6}$ m and in particular from $0.5 \times 10^{-6}$ to $200 \times 10^{-6}$ m.

The mean molecular weight of the polymers containing sulfoxide groups, expressed as the weight average $M_w$, is, according to the invention, between 4,000 and 200,000 g/mol, preferably between 10,000 and 150,000 g/mol, particularly preferably between 25,000 and 100,000 g/mol.

The molding composition of the invention as such or likewise the foam material produced therefrom can be used for producing shaped parts. The shaped parts can be used as functional components capable of withstanding high stresses, for example in aircraft and automobile construction. Further possible uses of the shaped parts are in construction of chemical apparatus. The foam materials or shaped parts can serve as chemical- or heat-resistant insulation materials.

The materials can be free-foamed or foamed in pressing molds so that ready-finished components can be obtained.

Advantages of the process of the invention for producing foamed fluoropolymer structures are that no addition of low molecular weight blowing agents is necessary, the process can be carried out using simple technical means, fluoropolymer foams having a particularly low density are possible and the degree of foaming and the pore size can be set within a wide range.

The invention is illustrated below by means of examples, but without being restricted to the concrete embodiments presented.

EXAMPLE 1

A molding composition of 45 g of finely ground fluoropolymer having the structure

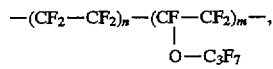

where n=0.96 and m=0.04, and 5 g of finely ground polyphenylene sulfoxide (prepared according to DE-A 43 14 737.6) was introduced into an aluminum tray having dimensions of 8.6 cm×5.5 cm and heated in a closed oven for 25 minutes at a temperature of 310° C. This resulted in formation of a foam having a dense, closed outer skin (integral foam). The density of the foam was 0.41 g/cm³ (for comparison: the density of the pure fluoropolymer is 2.15 g/cm³).

The foam showed the chemical resistance expected for this fluoropolymer. Thus, it was not attacked by, for example, HCl (37%), HNO₃ (65%), H₂SO₄ (95%), CH₃COOH (100%), NaOH (20%) and CHCl₃.

EXAMPLE 2

A molding composition of 4.5 g of fluorocopolymer made up of 46% by weight of tetrafluoroethylene units, 44% by weight of ethylene units and 10% by weight of hexafluoropropylene units, and 5 g of finely ground polyphenylene sulfoxide as in Example 1 are heated in a glass tube having a diameter of 5 mm for a period of 15 minutes at a temperature of 330° C. in a closed oven. This resulted in the formation of a foam having a dense, closed outer skin. The volume of the foam here increased to 2.5 times the initial volume.

We claim:

1. A process for producing a foam material from a molding composition comprising a a fluoropolymer and at least one polymer containing sulfoxide groups, said process comprising: heating the molding composition at a temperature in the range from 240° C. to 400° C.

2. The process as claimed in claim 1, wherein the sulfoxide groups decompose to liberate oxygen or CO₂ and H₂O, which decomposition effects the blowing of the fluoropolymer.

3. The process as claimed in claim 1, wherein the molding composition contains from 3 to 30% by weight of a polyarylene sulfoxide.

4. The process as claimed in claim 1, wherein said temperature is in the range of 280° C. to 340° C.

5. The process as claimed in claim 1, wherein the heating is carried out over a period of from 5 to 30 minutes.

6. A foam material comprising a foamed fluoropolymer produced by the process as claimed in claim 1 which has a density of at least 50% less than that of the unfoamed material.

7. The foam material as claimed in claim 6, which additionally contains a thermal stabilizer, an UV stabilizer, an antistatic agent, a dye, a pigment, an inorganic filler, an organic filler, an inorganic filler or a mixture thereof.

8. The foam material as claimed in claim 6, wherein the foam is an integral foam.

9. A shaped article comprising a foam material produced by the process of claim 1.

10. A process for producing a foam material from a molding composition containing at least one fluoropolymer and a blowing agent, said process comprising: heating the molding composition at a temperature in the range from 240° C. to 400° C. until said blowing agent decomposes to convert the said composition to a foam, said blowing agent comprising at least one polymer containing sulfoxide groups and being present in the mount of from 1 to 50% by weight, based on the weight of the molding composition, wherein at least one said fluoropolymer has recurring units of the formulas I to VII:

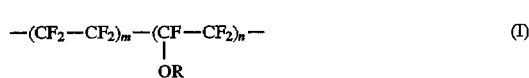

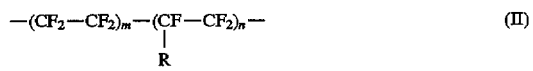

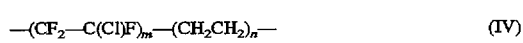

where R in formulas I and II is a perfluorinated alkyl radical having from 1 to 8 carbon atoms or a plurality of different radicals of this type, where m and n are each numbers from 0.01 to 1 and the sum of m and n is always 1 and where the fluorine atoms can be partially replaced by chlorine.

* * * * *